Figure 1:
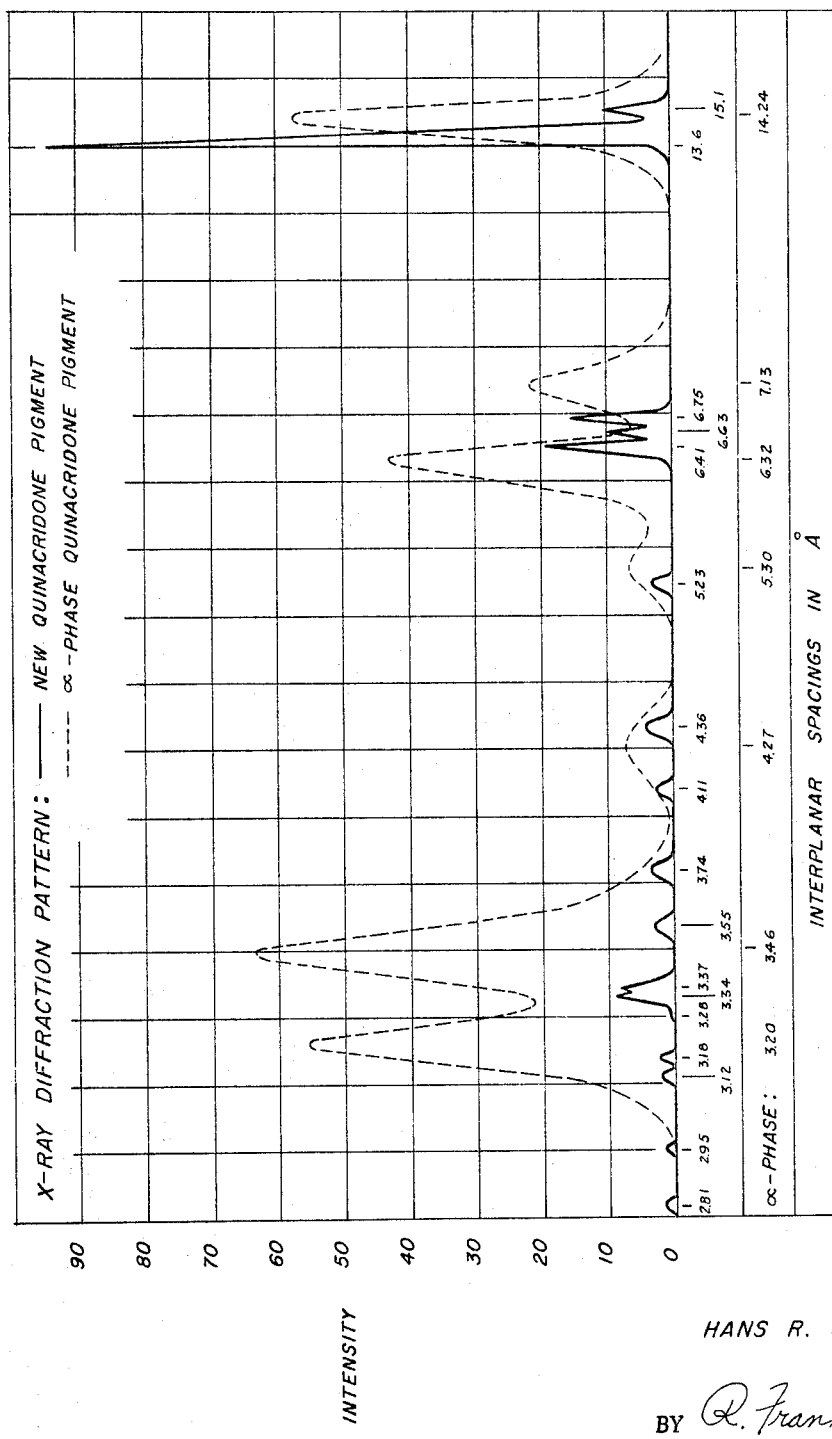

Sept. 13, 1966   H. R. SCHWEIZER   3,272,821
DELTA FORM OF QUINACRIDONE PIGMENT
Filed April 26, 1962   3 Sheets-Sheet 1

HANS R. SCHWEIZER
INVENTOR.

BY R. Frank Smith
Harold N. Powell
ATTORNEYS

United States Patent Office 3,272,821
Patented Sept. 13, 1966

3,272,821
DELTA FORM OF QUINACRIDONE PIGMENT
Hans R. Schweizer, Herrliberg, Zurich, Switzerland, assignor, by mesne assignments, to Eastman Kodak Company, Rochester, N.Y., a corporation of New Jersey
Filed Apr. 26, 1962, Ser. No. 190,251
3 Claims. (Cl. 260—279)

This invention concerns a new crystalline form (delta-phase) of quinacridone and also relates to certain substituted quinacridones. It also concerns a method of preparing this crystalline form of quinacridone and of purifying quinacridone and substituted quinacridones.

Quinacridones of the general class under consideration herein are known chemicals and methods for the production of such type materials have been described. Also the utility of such pigments for coloring lacquers and the like have been described. While the existing pigments of the class indicated are relatively good, some of the reds have been of bluish or violet hue. Also the stability of products colored therewith and the amount of coloring material required for a particular purpose appeared susceptible of advancement. It is, therefore, believed apparent that providing certain new forms of quinacridones and their derivatives represents a highly desirable result. After extended investigation I have discovered certain new forms of quinacridones and methods of producing and using as will be set forth in detail hereinafter.

The crude quinacridone used for these sublimations of this invention was obtained by ring closure in Dowtherm of 2,5-dianilino-3,6-dihydroterephthalate followed by oxidation of the dihydroquinacridone to quinacridone as described in U.S. Patent 2,821,529. The 2,5-dianilino-3,6-dihydroterephthalate was obtained by the condensation of succinylosuccinic ester (ethyl 1,4-cyclohexandione-2,5-dicarboxylate) with aniline as set forth in U.S. Patent 2,821,541.

Three different crystalline forms are disclosed in the art, namely α, β, and γ, and these are obtained by various treatments of crude quinacridone pigment with solvents as discussed in U.S. Patents 2,844,484; 2,844,485; 2,844,581; and 3,007,930.

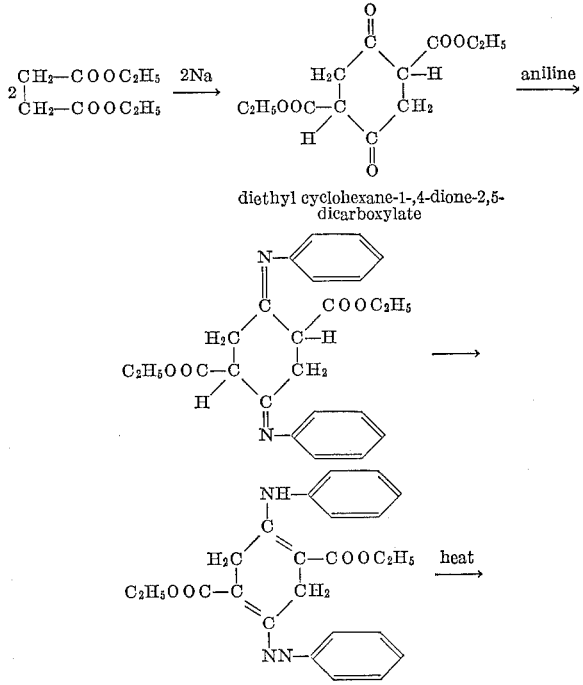

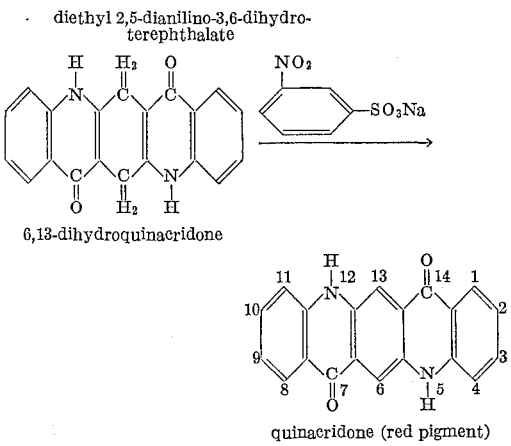

Quinacridone and its isomers may also be prepared by the method of A. Liebermann who first described its preparation by dehydrogenating 2,5-dianilino-3,6-dihydroterephthalate to 2,5-dianilinoterephthalic acid prior to cyclization of the latter in boric acid at 320° C. [Ann. 404, 300 (1914) and Ann. 518, 245 (1935)]. Liebermann stated that quinacridone is a violet-red amorphous powder which carbonized above 400° C. This is contrary to my finding that it can be sublimed under reduced pressure at temperatures well over 400° C., as will be shown in detail hereinafter.

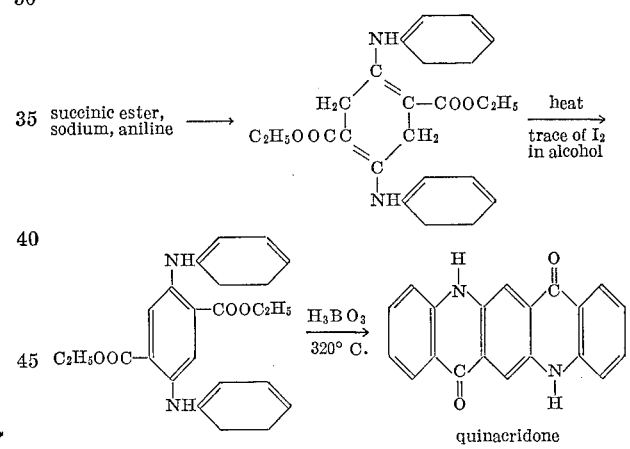

Thus, while three distinct crystalline forms of quinacridone and its derivatives have all been recognized in the art, and have been isolated from the crude mixture by chemical means, I have found that by employing a particular physical means of separation, namely sublimation, of crude quinacridone or its derivatives in a high vacuum (0.05–0.1 mm.) and at high temperatures (425° C.), a still further and unexpected crystalline form (delta-phase) exists, which form possesses properties rendering it a superior pigment and otherwise advantageous.

It is one object of this invention to provide a new crystalline form of quinacridone and its derivatives. Another object is to provide a satisfactory process for preparing such new quinacridone compounds. A particular object is to provide a sublimation process for quinacridones. A further object is to provide pigmented dopes and melts from which textile fibers and films may be prepared. Another object is to provide colored textile materials, films, sheeting and molded objects which have a red color and possess good fastness properties. Still another object of my invention is to provide cellulose alkyl carboxylic acid ester textile materials which have good fastness properties and to provide colored polyester textile materials having good light fastness properties. A still further but particular object is to provide colored cellulose acetate textile materials which have good light fastness. Other objects will appear hereinafter.

In the broader aspects of this invention, and in contrast to the operation of Liebermann, I have now found that quinacridone can be sublimed at temperatures somewhat above 400° C. without being decomposed materially. Thus sublimation of crude product at 405–425° C. at 0.05–0.1 mm. for 26 hours yielded 84% of purified new crystalline form of quinacridone. This compares with a recovery of 52% purified quinacridone by similar sublimation at 425° C. for 20 hours and a 40% recovery at 460–480° C. for 2 hours.

Sublimation of the quinacridone occurs also at temperatures below 400° C. but takes place then considerably slower. At temperatures below 350° C. the sublimation occurs so slowly as to be of litle practical value. While the crude quinacridone can be purified to a considerable extent by one sublimation at reduced pressure, thereby effecting the separation of quinacridone from nonsublimable impurities, a resublimation of the purified material is recommended thereby separating crystals of pure reddish quinacridone from some bluish sublimable impurities. For example, resublimation of a sample of quinacridone at 475° C. and at reduced pressure yielded 84% of pure reddish quinacridone showing an elemental analysis for C, H and N almost identical with theoretical values; there was also obtained 12% of the bluish impurity having considerably higher carbon and hydrogen values.

Figure 2:
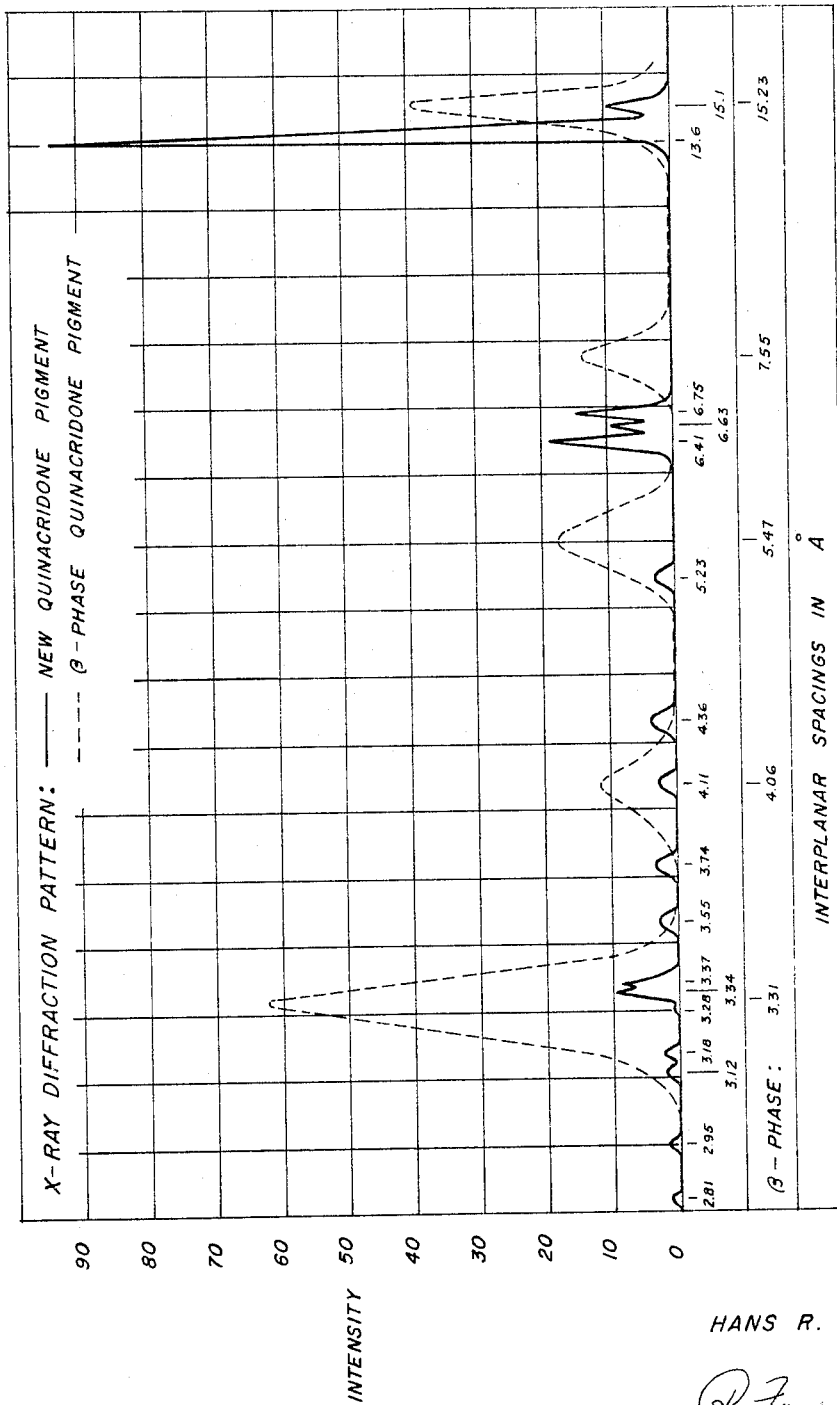
Figure 3:
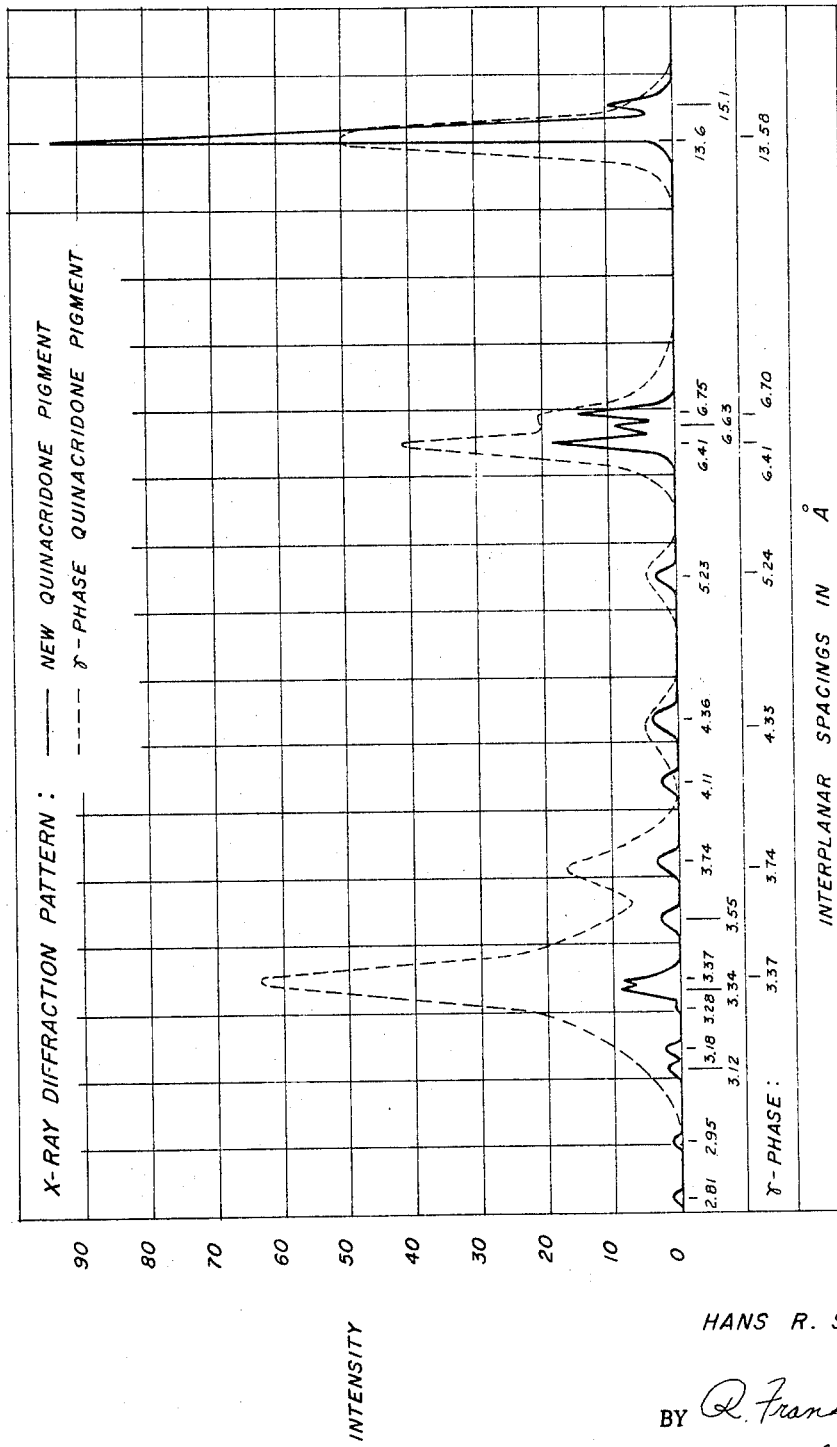

FIG. 1 is an X-ray diffraction pattern of the new sublimed quinacridone pigment of this invention as compared to the known alpha-form of the prior art. FIG. 2 is a like diffraction pattern comparing this new form of quinacridone pigment with the beta-phase form. FIG. 3 is a further comparison between the diffraction pattern of the new delta-phase quinacridone pigment of this invention as compared to the gamma-form.

The solid lines of FIGS. 1, 2 and 3 illustrate the complete X-ray diffraction pattern of the new sublimed delta-phase form of quinacridone as obtained in accordance with this invention. On these same figures, and in broken lines for comparison, are shown typical diffraction patterns of the known apha-, beta-, and gamma-form as disclosed in such prior art as British Patent 828,052 as well as in U.S. Patents 2,844,484, 2,844,485 and 2,844,581. The curves of the pigment of the present invention were obtained on a Norelco X-ray diffractometer measuring the relative intensity of the diffracted X-ray with a Geiger counter.

While this new crystalline form of quinacridone shows some X-ray spacings identical or nearly identical with the known γ-form, there are many other weak and strong lines that do not correspond with either the γ-form or the α- or β-form of quinacridone. These values are given in the examples. As it is thought will be apparent from the description and particularly the examples which follow, the double sublimation procedure of the present invention produces new and unobvious results and a new pigment.

The following examples which are set forth to describe certain preferred embodiments illustrate in further detail the invention and the manner in which this new crystalline form of quinacridone may be prepared and employed as a pigment.

EXAMPLE 1

*Preparation of succinylo-succinic ester*

Two thousand ml. distilled anisole were placed in a four-necked flask, fitted with stirrer, reflux condenser, dropping funnel and an inlet for nitrogen and 82.0 g. sodium metal were added. The temperature was then raised to approximately 100° C. while a stream of nitrogen was passed through the flask. The sodium was then pulverized with a vibrated stirrer. After cooling to 50° C., 192.0 g. absolute ethanol were added slowly in the course of about 1 hour. The temperature was kept afterwards for 2 hours at 70–80° C. and then 400 g. distilled succinic diethyl ester was added at once. The temperature was raised within 2 hours to about 90° C. During the whole foregoing procedure, the mixture was constantly stirred. The reaction was then kept for some hours at 90–100° C. without stirring. After cooling to about 50° C., it was treated with a suspension of 320 g. sodium bicarbonate in 1600 ml. water. The anisole solution was then washed with several portions of a sodium chloride solution, the total amount of solution being 400 g. sodium chloride in 2400 ml. water.

After cooling to about 5° C., the anisole yielded 181.7 g. succinylo-succinic diethyl ester, melting point 127–127.5° C. (corrected). After one recrystallization from 3000 ml. boiling ethanol, 172.6 g. recrystallized product was obtained, melting point 127.5–128° C. (corrected). This is 58.7% of the theory. By evaporating the anisole mother liquor in vacuo to dryness, another 38.7 g. crude ester was obtained, melting point 122.5–123.5° C. It was treated with some charcoal and recrystallized from 1000 ml. ethanol, yielding another 37.4 g. or 12.7% of the theory, melting point 126–127° C. (corrected).

The total amount of succinylo-succinic diethyl ester recovered was therefore 210.0 g. or 71.4% of the theory.

EXAMPLE 2

*Preparation of diethyl 2,5-dianilino-3,6-dihydroterephthalate*

In a 1½-liter flask fitted with a condenser, stirrer and protected by a nitrogen atmosphere was placed 250 g. of Dowtherm A. This was heated to 120° C. and 10.4 g of sodium in small pieces was added and after it was melted it was stirred vigorously for a short time after which it was cooled to 55° C. Over a 6-hour period there was then added portionwise with stirring 24 g. of anhydrous alcohol at such a rate that the temperature did not exceed 75° C. After the addition was complete the temperature was kept at 75° C. for 2 hours after which 50 g. of diethylsuccinate was added rapidly and then the temperature was raised to 95–100° C., and the charge kept at this temperature with stirring and under nitrogen for 8 hours.

The reaction mixture was then neutralized with a slurry of 40 g. of sodium bicarbonate in 200 g. of water at 50° C. for 20 minutes. The bottom aqueous layer was then drawn off and the charge was washed with a solution of 50 g. of salt in 300 ml. of water at 70° C. after which the lower aqueous layer was again drawn off.

To the charge was then added 160 g. of aniline and 0.5 grams of aniline hydrochloride. It was heated under nitrogen at 108–110° C. at 35 mm. for 3 hours with only air in the condenser. Any aniline carried over with the water given off by the condensation was replaced. After cooling to 60° C., 0.25 g. of sodium carbonate in 5 ml. water was added to neutralize the HCl and the water was removed under vacuum below 60° C. The excess aniline was then removed at 25 mm. and a maximum temperature of 143° C. for 6 hours. Cooling and stirring gave a slurry which on filtering amounted to 49 g. of diethyl 2,5 - dianilino - 3,6 - dihydroterephthalate powder after washing free of Dowtherm A and drying. This powder is stable as long as kept free of water.

For preparing quinacridone the above product need not be filtered from the Dowtherm.

In the same manner as that described immediately above, the following substituted anilines were used in place of aniline: o-chloroaniline, p-chloroaniline, p-fluoroaniline, p-bromoaniline, o-methylaniline, p-ethylaniline, o-methoxyaniline and p-ethoxyaniline. The product in each of these eight different reactions was the respective substituted dianilinodihydroterephthalate, such as diethyl 2,5-di-(2'-chloroanilino)-3,6-dihydroterephthalate and diethyl 2,5-di-(4'-chloroanilino)-3,6-dihydroterephthalate, etc.

EXAMPLE 3

Preparation of crude quinacridone

A solution of 10 g. of diethyl 2,5-dianilino-3,6-dihydroterephthalate in 40 g. of Dowtherm A was heated and stirred at 255° C. for 1 hour under a $N_2$ atmosphere. The charge was cooled to room temperature and diluted with 20 g. of ethyl alcohol to give a slurry which was filtered and washed with ethyl alcohol to yield 6.8 g. of pale tan-colored 6,13-dihydroquinacridone.

The above 6.8 g. of dihydroquinacridone was oxidized to quinacridone by refluxing for 2 hours with 13.6 g. of sodium m-nitrobenzene sulfonate in a solution of 136 g. of ethyl alcohol and 17 g. of water containing 2.7 g. of sodium hydroxide. After cooling, the product was filtered off and washed with alcohol and then with water until alkali free. 6.5 g. of bright red quinacridone was obtained.

*Analysis.*—Calc. for $C_{20}H_{12}O_2N_2$: C, 76.91%; H, 3.87%; N, 8.97%. Found: C, 75.30%; H, 3.88%; N, 8.86%.

In the manner described immediately above, a ring closure and oxidation were carried out on the substituted dianilinodihydroterephthalates disclosed in Example 2. In this fashion the following substituted quinacridones were prepared:

4,11-dichloroquinacridone;
2,9-dichloroquinacridone;
2,9-difluoroquinacridone;
2,9-dibromoquinacridone;
4,11-dimethylquinacridone;
2,9-diethylquinacridone;
4,11-dimethoxyquinacridone and
2,9-diethoxyquinacridone.

The sublimation and resublimation of these substituted quinacridones using the procedures described in Examples 5, 6 and 7 gave compositions far superior in light fastness properties to the samples which had not been sublimed.

EXAMPLE 4

Preparation of crude quinacridone

Crude quinacridone similar to that of Example 3 can also be prepared by the method of A. Liebermann, Ann. 404, 300 (1914) and Ann. 518, 245 (1935). The diethyl 2,5-dianilino-3,6-dihydroterephthalate of Example 2 is dehydrogenated by refluxing in ethyl alcohol containing a trace of iodine for 3 hours. The resulting 2,5-dianilinoterephthalate ester was converted to the free acid which was then cyclized to quinacridone by heating in a melt of five times its weight of boric acid for 5 min. at 265° C. and then at 325° C. for 30 minutes. The cooled melt was treated with water and filtered to yield the red quinacridone.

EXAMPLE 5

Sublimation

A sample of 0.419 g. of crude quinacridone was sublimed at 405–425° C. and 0.05–0.1 mm. for 26 hours, yielding 0.347 g. sublimate which is 84% of purified quinacridone.

EXAMPLE 6

Sublimation

In another sublimation at reduced pressure for 20 hours at 425° C., a 0.79 g. sample of crude quinacridone yielded 0.41 g. (52%) of purified material. In another experiment at 460–480° C. for 2 hours, 0.717 g. of crude yielded 0.29 g. (40%) of sublimate.

EXAMPLE 7

Resublimation

A 0.302 g. sample of the above sublimed purified quinacridone was sublimed once more at 425° C. and 0.05 to 0.1 mm. for 17 hours. There was obtained at the far end of the sublimation tube 0.044 g. (15%) of a bluish sublimate which is a by-product. In a separate zone nearer the heated end of the sublimation tube there was deposited 0.243 g. (80%) of a reddish sublimate which is pure quinacridone.

*Analysis.*—Bluish sublimate (by-product): Calc. for $C_{20}H_{12}O_2N_2$: C, 76.91%; H, 3.87%; N, 8.97%. Found: C, 80.59%; H, 4.13%; N, 8.94%.

*Analysis.*—Reddish sublimate (quinacridone): Calc. for $C_{20}H_{12}O_2N_2$: C, 76.91%; H, 3.87%; N, 8.97%. Found: C, 76.98%; H, 3.97%; N, 8.82%.

Another resublimation at 425° C. for 6 hours gave 84% reddish sublimate and 12% of bluish sublimate. Still another resublimation at 415–420° C. yielded after 15 hours 80% of reddish sublimate and 18% of bluish sublimate.

EXAMPLE 8

X-ray diffraction pattern of the purified new crystalline form of quinacridone The sublimed pure quinacridone from Example 7 is crystalline. The interplanar spacings thereof as obtained by the X-ray diffraction pattern as obtained on a photographic film are given in Angstrom units in the accompanying table. The sublimed quinacridrone shows a number of spacings which are identical or almost identical with those of the already claimed γ-phase of this compound. It differs materially from the hitherto known γ-form by showing a weak line at 15.1 Angstrom, a medium line at 3.55 A., a strong double line at 3.37 and 3.34 A., a weak to medium line at 3.184 A. and a weak double line at 2.948 and 2.915 A. It also shows weak lines at 4.11 A., 4.00 A., 3.64 A., 3.28 A., 3.247 A., 3.119 A. and 2.813 A. Comparison with the already known forms of quinacridone shows easily that the sublimed crystals are identical with none of the already claimed crystalline forms.

*Characteristic X-ray diffraction pattern band intensities [1] of quinacridone (in angstrom units)*

| New Delta-Phase Sublimate | γ | β | α |
| --- | --- | --- | --- |
| 15.1 w | | 15.23 s | 14.24 s. |
| 13.6 m | 13.58 s | | |
| 6.63 m | 6.70 m | 7.55 m | 7.13 m. |
| 6.41 s | 6.41 s | | 6.32 m. |
| 5.23 w | 5.24 m | 5.47 m | 5.30 w. |
| 4.36 w | 4.33 m | | 4.27 w. |
| 4.11 w | | | |
| 4.00 w | | 4.06 m | |
| 3.74 m | 3.74 m | | |
| 3.64 w | | | |
| 3.55 m | | | |
| 3.37 s | 3.37 s | | 3.46 s. |
| 3.34 s | | 3.31 s | |
| 3.28 w | | | |
| 3.247 w | | | |
| 3.184 w/m | | | 3.19 s. |
| 3.119 w | | | |
| 2.948 w | | | |
| 2.915 w | | | |
| 2.813 w | | | |
| 2.4125 w | | | |
| 2.2075 m | | | |
| 2.179 w | | | |

[1] w=weak. m=medium. s=strong.

The crystalline form of quinacridone and its derivatives as obtained by this invention is entirely different from the previously described α, β, and γ forms of quinacridrone. This new form which I have discovered is a superior reddish pigment, and when it is incorporated into a cellulose acetate dope it yields a pigmented film or fiber of excellent fastness properties. The following examples describe the preparation of films and yarn which have been pigmented with the new crystalline form of quinacridone such as I have discovered.

EXAMPLE 9

6.89 g. of a 29% solution of secondary cellulose acetate in acetone, 19.1 ml. of acetone, 0.4 g. of the pigment of Example 7, and 35 g. of sand were ground together for 30 minutes. After stirring in 20 ml. of acetone the mix was filtered through Orlon cloth and allowed to dry on a glass plate. 0.500 g. of the dried material was dissolved in 15.9 g. of the 29% cellulose acetate solution and cast onto a glass plate and dried. The resulting red film had excellent resistance to light.

EXAMPLE 10

5 g. of the finely ground pigment of Example 7 and 495 g. of powdered polyester from cyclohexylbis[methanol] and terephthalic acid having an intrinsic viscosity of 0.68 are mixed well by tumbling and then extruded from the melt at 300–310° C. Beautiful, fast red filaments are obtained.

EXAMPLE 11

A pigment mix consisting of 15% by weight of the quinacridone pigment of Example 7 and 5% cellulose acetate by weight was ball milled in the presence of acetone. An amount of this mix was added to a fiber-forming spinning dope consisting of acetone solvent and cellulose acetate (39.4% acetyl) at a concentration of 27% to give a concentration of quinacridone pigment therein of 2% based upon the weight of the cellulose acetate. After blending the pigment mix into the spinning solution, the resulting colored dope was dry spun in a conventional manner by extrusion through small orifices into a drying chamber to remove the solvent. Bright red fibers having good fastness and excellent physical properties were obtained.

EXAMPLE 12

The pigmented cellulose acetate dope of Example 11 was cast into red films to give sheeting having excellent fastness properties.

By quinacridone derivatives I refer to compounds wherein the positions 1, 2, 3, 4 and 8, 9, 10, 11 are substituted by a halogen such as chlorine, bromine or fluorine or by an alkyl or alkoxyl group. Examples of such derivatives are as follows:

2,9-dichloroquinacridone; 4,11-dichloroquinacridone; 3,10-dichloroquinacridone; 2,9-dimethylquinacridone; 2,9-dimethoxyquinacridone; 2,4,9,11-tetramethylquinacridone, and the like.

While the utility of the new delta-phase form of quinacridone as disclosed hereinabove has been indicated primarily as a red pigment for cellulose acetate yarn, it is also useful for coloring other synthetic textile materials including those which are melt spun. Dispersions of my pigment may be made by conventional and well-known means, and incorporated into the melts of, for example, such materials as polyamides (nylon) and polyolefins; polyesters such as are described in U.S. Patents 2,465,319, 2,744,088, and 2,901,466 may also be colored according to this process.

Other synthetic textile materials may also be pigmented with the new form of quinacridone described herein, including acrylics and modacrylics.

Films and molded objects prepared from any of the aforementioned materials may also be so pigmented.

This invention has been described in detail with particular reference to preferred embodiments thereof, but it will be understood that variations and modifications can be effected within the spirit and scope of the invention as described hereinabove and as defined in the appended claims.

I claim

1. A method for purifying linear quinacridones which comprises subliming crude linear unsubstituted quinacridone in a high vacuum within the range 0.05–0.1 mm. Hg and at temperatures within the range of 405–480° C.

2. A method for purifying linear quinacridones which comprises subliming crude linear unsubstituted quinacridone in a high vacuum within the range 0.05–0.1 mm. Hg and at temperatures within the range of 405–480° C., collecting the sublimed unsubstituted quinacridone obtained, and thereafter re-subliming this purified unsubstituted quinacridone in a high vacuum within the range of 0.05–0.1 mm. Hg and at temperatures within the range of 405–480° C.

3. A new linear, unsubstituted, yellowish red quinacridone compound: 5,12-dihydroquino-(2,3-b)-acridine-7,14-dione, having the formula

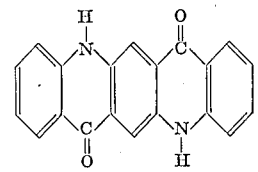

possessing a new delta crystalline form and characterized by an X-ray diffraction pattern having a very strong line corresponding to an interplanar spacing of 13.6 A.; strong lines corresponding to interplanar spacings of 6.41 A. and 6.75 A.; medium lines corresponding to interplanar spacings of 3.34 A., 3.37 A. and 6.63 A.; and weak lines corresponding to interplanar spacings of 2.81 A., 2.95 A., 3.12 A., 3.18 A., 3.55 A., 3.74 A., 4.11 A., 4.36 A. and 5.23 A., wherein the relative intensity of the diffracted X-ray is measured with a Gieger counter.

References Cited by the Examiner

UNITED STATES PATENTS

| | | | |
|---|---|---|---|
| 2,506,224 | 5/1950 | Kopp et al. | 8—57 |
| 2,801,996 | 8/1957 | Siegel et al. | 260—279 |
| 2,830,990 | 4/1958 | Struve | 260—279 |
| 2,925,421 | 2/1960 | Pizzarello et al. | 106—176 |
| 2,971,855 | 2/1961 | Dupuy et al. | 106—176 |
| 3,002,845 | 10/1961 | Hoelzle | 106—288 |
| 3,017,414 | 1/1962 | Minnich et al. | 260—279 |
| 3,020,279 | 2/1962 | Woodlock et al. | 260—279 |
| 3,036,876 | 5/1962 | Schoellig et al. | 8—55 |
| 3,042,683 | 7/1962 | Howard et al. | 106—176 |
| 3,074,950 | 1/1963 | Deuschel et al. | 260—279 |
| 3,085,023 | 4/1963 | Ehrich | 260—279 |

FOREIGN PATENTS

| | | |
|---|---|---|
| 828,052 | 2/1960 | Great Britain. |
| 1,233,785 | 5/1960 | France. |

OTHER REFERENCES

Hamm et al.: Applied Physics, vol. 19, pp. 1097–1109 (1947).

Perry: Chemical Engineer's Handbook, 35d. ed., Mc-Graw-Hill, 1950, pp. 660–662 relied on.

Tipson: Techniques of Organic Chemistry, vol. IV, "Distillation," pp. 610–12 (1951).

United States Publication Board Report 70339, Frames 11311–13, Oct. 26, 1935.

ALEX MAZEL, *Primary Examiner.*

D. McCUTCHEN, IRVING MARCUS, *Examiners.*

D. M. KERR, DONALD G. DAUS, *Assistant Examiners.*